June 29, 1926.

J. L. MAHONEY 1,590,768

MOLD FOR MAKING HOLLOW RUBBER ARTICLES

Filed Dec. 21, 1923     3 Sheets-Sheet 1

INVENTOR,
Jeremiah L. Mahoney.
BY
N. P. Hutchinson,
ATTORNEY

June 29, 1926.
J. L. MAHONEY
MOLD FOR MAKING HOLLOW RUBBER ARTICLES
Filed Dec. 21, 1923    3 Sheets-Sheet 2
1,590,768
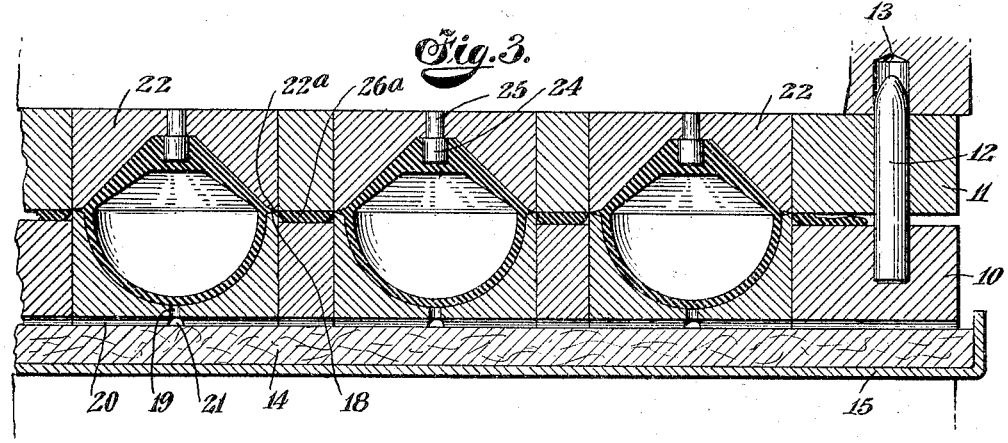
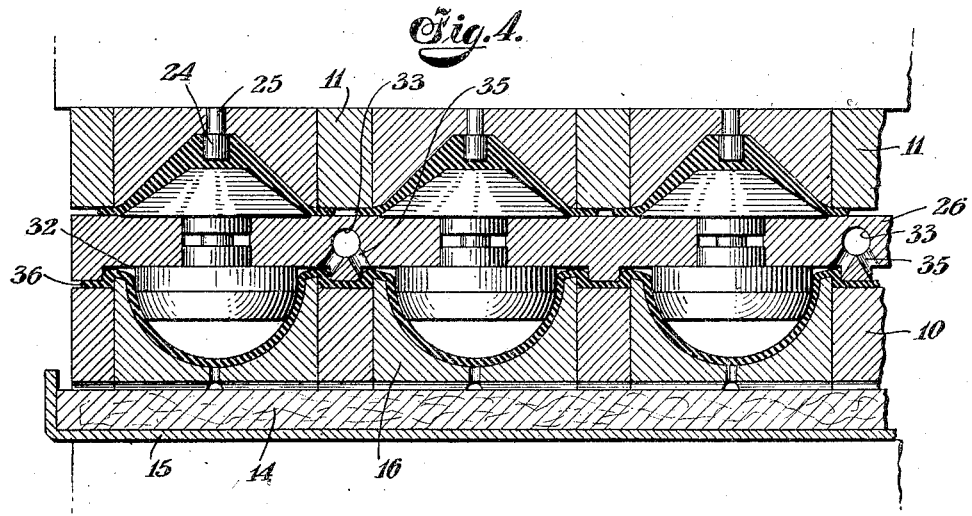
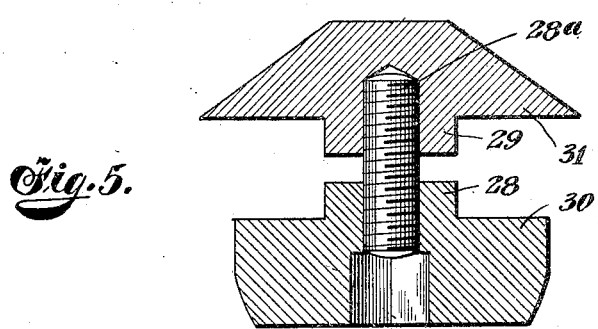

June 29, 1926.

J. L. MAHONEY 1,590,768

MOLD FOR MAKING HOLLOW RUBBER ARTICLES

Filed Dec. 21, 1923  3 Sheets-Sheet 3

INVENTOR
Jeremiah L. Mahoney.
BY
W. B. Hutchinson
ATTORNEY

Patented June 29, 1926.

1,590,768

UNITED STATES PATENT OFFICE.

JEREMIAH L. MAHONEY, OF NEW HAVEN, CONNECTICUT, ASSIGNOR TO THE CANFIELD RUBBER COMPANY, OF BRIDGEPORT, CONNECTICUT, A CORPORATION OF CONNECTICUT.

MOLD FOR MAKING HOLLOW RUBBER ARTICLES.

Application filed December 21, 1923. Serial No. 681,905.

My invention relates to improvements in shaping or forming hollow rubber articles, and also to an improved method of forming such articles. It will be understood that in referring to rubber articles, I use the term generally as applying to rubber compositions and the like. The object of my invention is generally to produce hollow rubber articles, such for instance, as flush tank balls, hollow rubber balls, and other hollow articles, more cheaply and expeditiously than they are at present made. In consonance with this idea, my invention also relates to an improved mold or apparatus which is simple in construction, is thoroughly practical, and by the use of which I can simultaneously form both parts of a hollow article, such for instance as a ball, then remove the mold portion, and then secure the two parts of the various articles together ready for the vulcanizing mold. My invention is intended further to provide a molding apparatus in which the lower part rests on a yielding bed so as to compensate for any possible inequalities in the molding apparatus when in use, and in this lower part I provide a lot of removable mold sections. An opposing member which is movable in relation to the first member carries the other mold cavities for the articles to be formed. Between the two members is a movable plate which carries the mold forms to press the rubber sheets into the several cavities, and when the movable part of the apparatus is brought to place and the forming members and the stock are in position, a whole series of articles are formed at once, and both parts of each article are also approximately shaped. The movable plate is then removed, and another stroke of the press, that is another movement of the cavity frames towards each other, secures the two parts of the several articles together, and also trims the stock around the several articles. I also provide means to insert air under pressure in the formed articles to hold them in shape, and means for relieving the air pressure behind the parts as they are formed.

From the description which follows it will be seen that my method and apparatus provide a very expeditious simple and sure way of forming articles of the kind referred to, and that it operates with no waste of time or stock.

Figure 3 is a view similar to Figure 2 but with the mold carrying plates removed, and with the press in position to secure the parts of the formed articles together and trim them.

Figure 4 is a cross section on the line 4—4 of Figure 2, showing particularly the arrangement of air ducts.

Figure 5 is a detail of a pair of forming molds.

Figure 1:
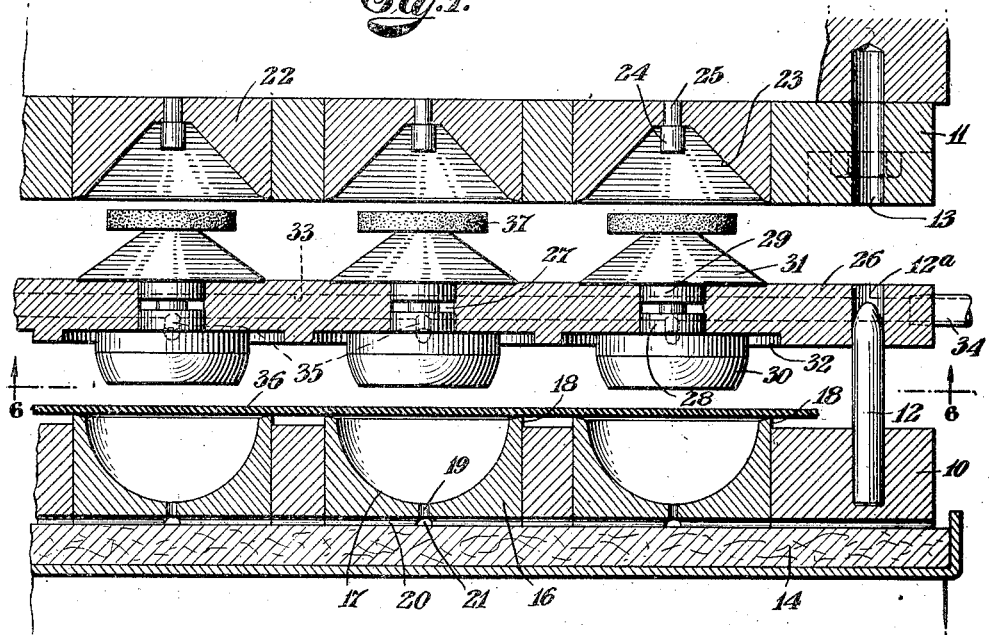
Figure 1 is a sectional elevation of my improved apparatus showing all the parts in position for use, and with the stock in position to form the several articles, the mold members being separated from each other.

The apparatus is provided with opposed frames 10 and 11 which are moved back and forth with relation to each other in a manner common to presses of this kind, and they also have a common means of effecting proper registration, that is to say, the member 10 can be provided with dowel pins 12 adapted to enter corresponding holes 13 in the member 11, so that the parts will be properly centered, and instead of this any other approved means can be used for effecting proper registration. The frame 10 which in the present instance is the lower frame, is preferably mounted on a resilient bed 14 which can conveniently be an elastic composition, held in place by a retaining plate 15. The object of this is to provide a yielding support for the part 10, so that when the member 11 is forced down upon it and the article formed as hereinafter described, any possible inequalities will be compensated for by the elasticity of the bed. The frame 10 has a series of removable cups 16, each containing a cavity 17 to form one part, usually one-half of an article, and as stated, these cups are preferably removable. They are placed in corresponding cavities of the frame 10, and each has a circumferential edge portion 18 slightly raised so as to effect a trimming of the stock from which the articles are formed, as hereinafter described. Each cup has also an opening through its bottom or outer part, a duct 19 connecting with a channel 20, and this with cross outlets 21 so that when the stock is forced into the cavities of the forming cups, the air from the back of the mold will pass out freely through the duct 19 and channels 20 and 21 so as to offer no interference with the proper formation of the article.

The opposite member 11 of the forming parts which in the present instance is the movable frame, has a series of removable cups 22 registering with the cups 16, and having cavities 23 therein to form the opposite parts of the articles under manufacture. In the present instance I have shown the apparatus as adapted for making flush tank balls, and so the cavity 23 is shaped to form a generally conical top, as this is customary in the trade, but it might be any other shape as well.

Obviously the inner surface of the cavities 17 and 23 can be of other shapes, and in the example I have shown in the top or back of the cavity 23, a pin 24 having a reduced part 25 extending into the wall of the cavity back, and the object of this is to form a hole in the top of the tank ball so that the usual metallic spud can be inserted. Obviously the pin could be left out if it is desired for any reason to have the surface of the formed article smooth.

In connection with the plates or frames 10 and 11 I use a removable plate 26 which may be thinner and lighter than the parts 10 and 11, and which is adapted to be used between them for carrying the forming molds. This plate is a generally flat plate, and has holes 12ª to register with the holes 13 in the plate or frame 11, so that the dowel pins 12 may pass through the holes 12ª and center the plate 26. The plate 26 also has transverse holes 27 opposite the central part of the several mold cavities 17 and 23, these holes 27 being for the purpose of receiving and centering the hubs 28 and 29 of the forming mold sections 30 and 31 (see Figure 5). These sections may be of the desired shape to form the hollow articles under construction. As illustrated the part 30 is intended to roughly mold the semispherical or lower part of a tank ball, while the part 31 is intended to shape the upper or generally conical part of a flush tank ball.

Figure 2:
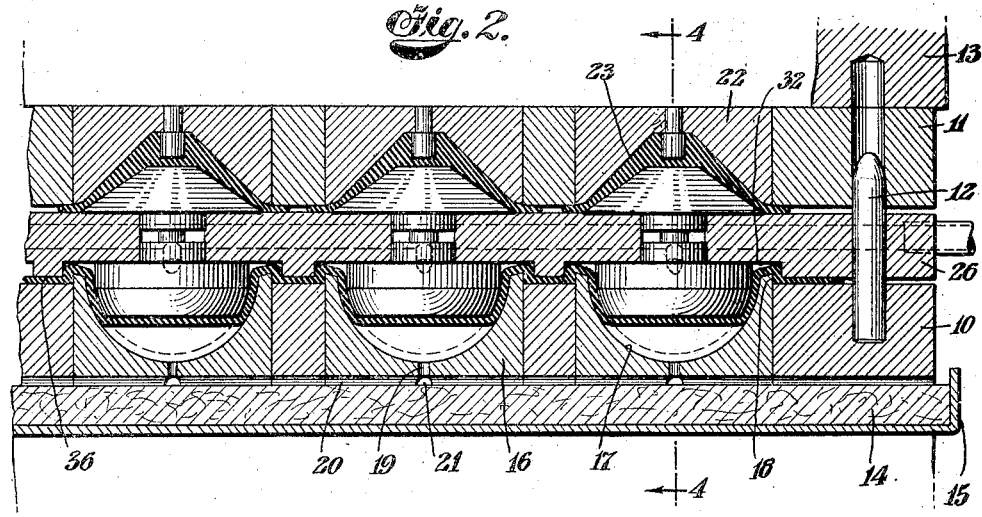
Figure 2 is a view similar to Figure 1, but showing the position of the parts when the mold members have been brought towards each other under pressure to form the several articles.
Figure 6:
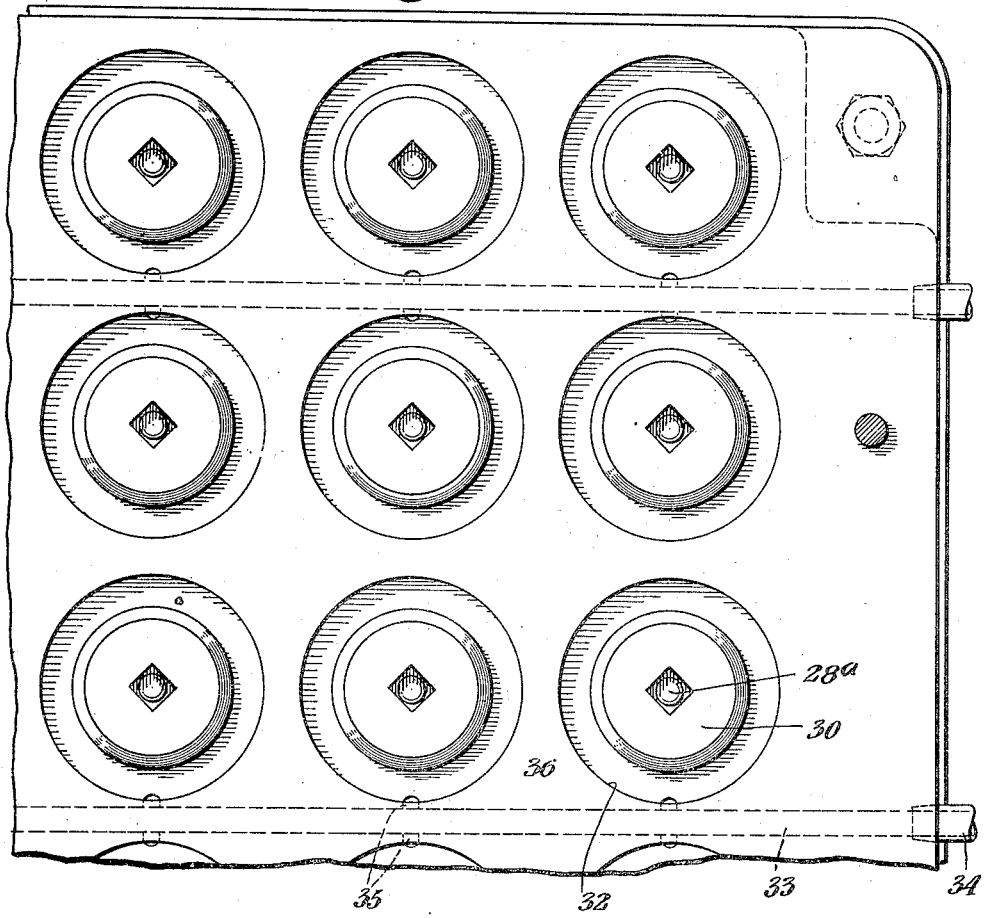
Figure 6 is a broken sectional inverted plan on the line 6—6 of Figure 1.

The members 30 and 31 are united by a screw stud 28ª or similar fastening; and it will be noted that they are thus held firmly in place, and that the backs of the members 30 and 31 abut with the plate 26 so that they are very solid, and when pressure is applied it comes from opposite sides of the mold members, and the strain is taken up by the bodies of said members and the plate 26. The plate 26 is also recessed as shown at 32 opposite each cup 16, so that the raised upper edge portion 18 of each cup may enter the recess 32 as shown in Figure 2, and leave clearance for the stock 36 under treatment. The plate 26 is also provided with air ducts 33, these being preferably arranged between rows of mold cavities as shown in Figure 6, and air under pressure may be supplied to the ducts from pipes 34, which may if desired be flexible. From the ducts 33 branch ducts 35 deliver to the lower mold cavities, and the pressure air may be let into the several cavities to roughly blow out and expand the formed articles.

When my improved method is to be carried out, the frames 10 and 11 are placed in a press as usual, except that the frame 10 is on its resilient bed 14. A sheet of stock 36 is laid across the lower mold cavities 17 and cups 16, the mold plate 26 is inserted in proper registry, and chunks of rubber 37, each having sufficient material to form the top of the tank balls, are placed on the mold members 31 as shown in Figure 1. A stroke of the press moves the member 11 towards the member 10, and the members 30 and 31 of the several molds are forced into the corresponding cavities 17 and 23, while the air pressure is let in through the ducts 33 and entering through the branch ducts 35, forces the stock against the back of the mold sections or cavities 17, this action being facilitated because the pressure moves out from the back of the several cavities through the ducts 19, 20 and 21. At the same moment the mold members 31 entering the cavities 23, shape the stock 37 to the shape of the several cavities, and force the plastic material around the forming pins 24 so as to form spud holes (see Figure 7) in the tops of the several tank balls. It will be noted that at this first stroke of the press, the half members of the several flush tank balls will be formed, the stock 36 following the contour of the mold cavities and molds as shown in Figure 2, and the stock 37 overflowing the cavities 23 so as to extend slightly beyond the edges of the cavities as shown in Figures 2 and 4.

Figure 7:
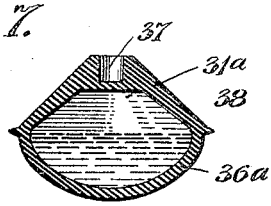
Figure 7 is a detail section of a formed article before it has been expanded in the vulcanizing press.
Figure 8:
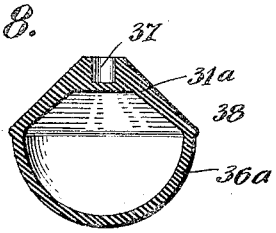
Figure 8 is a view of said article when completed.

When the members 11 and 10 separate, the plate 26 is removed, and the members of the press again brought together as shown in Figure 3, the stock meanwhile sticking to the backs of the mold cavities. When the plates or frames 10 and 11 are brought together as in Figure 3, the raised edges 18 of the cups 16 meet the corresponding parts 22ª of the cups 22 as in Figure 3, thereby pressing the edges of the formed articles together to unite them, and trimming the stock around the several formed articles. The raised part 18 of the mold sections provides clearance for the waste 26ª as shown in Figure 3. The mold plates are then separated, and the articles formed will appear roughly as shown in Figure 7, each tank ball 38 having a generally conical top 31ª with a spud opening 37 therein and a generally semi-spherical bottom 36ª. These articles are placed in a vulcanizing mold as usual, and chemically or otherwise expanded from the interior to give them their final shape, as shown in Figure 8, as they are vulcanized.

From the drawings and description it will be very clearly seen how a whole series of flush tank balls can be quickly, easily and cheaply formed by my improved method and apparatus, and it will be evident, obviously that whether the article made is a flush tank ball or other thing, depends on the shape of the cavities 17 and 24, and that these may be given different shapes to form different things, without in the least affecting the principle of the invention.

I claim:—

1. A molding apparatus comprising opposed frames or plates movable back and forth with relation to each other and provided with opposed registering mold cavities, and a mold carrier removably arranged between the two plates and having separable molds arranged to simultaneously enter the cavities of both said frames or plates.

2. A molding apparatus comprising separable plates having opposed registering mold cavities therein, and a removable member adapted to be placed between the plates and carrying separable and detachable molds to register with the aforesaid cavities.

3. A molding apparatus comprising plates or frames movable back and forth with relation to each other and carrying detachable cups having mold cavities therein, and a removable plate between the said frames, said removable plate carrying separable and detachable mold members to enter the cup cavities.

4. A molding apparatus comprising opposed frames movable with relation to each other and having registering mold cavities therein, a removable plate adapted to be placed between the aforesaid frames, said plate having mold members to enter the mold cavities of the frames and air ducts arranged to discharge into the aforesaid mold cavities.

5. A molding apparatus comprising opposed frames movable with relation to each other and having registering mold cavities, a removable mold carrier adapted to be held between the aforesaid frames, said carrier having mold members to enter the mold cavities of both frames, an air duct arranged behind the mold cavities to relieve the pressure, and an air duct in the carrier to admit air pressure to the cavities.

6. A molding apparatus comprising opposed frames movable back and forth with relation to each other and having registering mold cavities therein, a removable plate adapted to be arranged between the said frames, said plate having transverse holes therethrough, and mold members having hubs to enter the holes in the plate and adapted to enter the aforesaid mold cavities.

7. A molding apparatus comprising opposed frames movable with relation to each other and having registering mold cavities, a removable plate adapted to be arranged between the aforesaid frames, said plate having transverse holes therethrough, mold members on opposite sides of the plate to enter the aforesaid mold cavities, and means connecting through the aforesaid holes in the plate for uniting the opposed mold members.

8. A molding apparatus comprising opposed frames movable back and forth with relation to each other and having mold cavities therein, a mold carrying member having molds to enter the aforesaid cavities, and means for relieving air pressure from the backs of the cavities and admitting air pressure to the interior thereof.

9. The herein described method of molding hollow rubber articles, which consists in simultaneously molding opposed parts of said articles, admitting air pressure to the molded articles, relieving the air pressure from the backs of said molded articles, then removing the molds, and then uniting and trimming the opposed parts.

In testimony whereof, I have signed my name to this specification this 19th day of December, 1923.

JEREMIAH L. MAHONEY.